United States Patent
Böttcher et al.

[15] 3,685,348
[45] Aug. 22, 1972

[54] METHOD AND APPARATUS FOR TESTING WELDING SEAMS BY ULTRASOUND ENERGY

[72] Inventors: Wolfgang Böttcher, Dortmund-Brackel; Hermann-Josef Kopineck, Dortmund-Kirchhorde; Karl-Heinz Schlusnus, Hamm; Gernot Sommerkorn, Dortmund, all of Germany

[73] Assignee: Hoesch Aktiengesellschaft, Dortmund, Germany

[22] Filed: Dec. 22, 1969

[21] Appl. No.: 886,885

[30] Foreign Application Priority Data
Dec. 21, 1968 Germany..........P 18 16 255.5

[52] U.S. Cl.....................73/67.8 R, 73/67.6, 73/71.5
[51] Int. Cl.............................................G01n 24/04
[58] Field of Search...............73/67.5–67.9, 71.5; 340/8, 10; 181/.5

[56] References Cited

UNITED STATES PATENTS

| | | | |
|---|---|---|---|
| 3,575,044 | 4/1971 | Gibbs et al.............. | 73/67.9 |
| 3,262,307 | 7/1966 | Hart....................... | 73/71.5 |
| 3,274,822 | 9/1966 | Stanya..................... | 73/67.9 |
| 3,313,146 | 4/1967 | Krautkramer.............. | 73/67.8 |

FOREIGN PATENTS OR APPLICATIONS

| | | | |
|---|---|---|---|
| 1,471,333 | 3/1966 | France................ | 73/67.7 |
| 1,552,533 | 1/1968 | France................ | 73/67.7 |
| 716,687 | 10/1954 | Great Britain....... | 73/67.7 |
| 866,457 | 7/1958 | Great Britain....... | 73/67.7 |

*Primary Examiner*—Richard C. Queisser
*Assistant Examiner*—Arthur E. Korkosz
*Attorney*—Walter Becker

[57] ABSTRACT

A method of and apparatus for non-destructively checking by means of ultrasonic energy the material of a workpiece, especially a welding seam, in its longitudinal and in its transverse direction as to faults in the heterogenity of the material to be checked, according to which at least two ultrasonic ray bundles are simultaneously directed through a common coupling surface into the material to be checked while one of said bundles is so directed that it hits the longitudinal axis of the material to be checked at a right angle thereto whereas the other one of ray bundles is directed so as to hit said longitudinal axis at an angle of less than 90°, e.g., 45° or 60°, the sound ray bundles reflected by the respective section of the material to be checked being recorded to register possible faults of said material.

8 Claims, 7 Drawing Figures

INVENTORS:

Wolfgang Böttcher
Hermann-Josef Kopineck
Karl-Heinz Schlusnus
Gernot Sommerkorn

By Walter Becker

METHOD AND APPARATUS FOR TESTING WELDING SEAMS BY ULTRASOUND ENERGY

The present invention relates to a method of and apparatus for testing a welding seam by ultrasound energy in a non-destructive manner, i. e. without destroying the welding seam. More specifically, the invention concerns such method and apparatus for ascertaining whether the welding seam is heterogeneous with regard to the material in the welding seam in longitudinal direction — longitudinal faults — and in transverse direction — transverse faults. This testing is carried out by ultrasonic energy while employing at both sides of the seam ultrasonic probes which are guided parallel to the longitudinal axis of the welding seam and function as emitter and/or receiver.

The non-destructive testing of linear metal formations, such as welding seams, primarily of welded pipes with a longitudinal or helical seam by means of ultrasonic equipment is carried out primarily in such a way that a pair of ultrasonic probes which is guided on both sides of the welding seam and parallel thereto so that the equipment emits and receives its sound impulse in a direction perpendicular to the welding seam, and that one or more pairs of ultrasound probes are employed which at an angle of from 45° or 60° emit sound ray bundles onto the welding seam or receive the same therefrom for testing the welding seam as to transverse faults.

The testing for longitudinal faults in the welding seam has become an operation-safe method in view of the fact that it follows a testing method according to which in two first testing cycles the right-hand or the left-hand range of the welding seam zone is tested, and that in a third testing cycle in conformity with a through-sounding method, the proper working of the testing probes and the proper coupling to the work piece are checked. These testing cycles are repeated one after another at any desired sequence.

When testing the welding seam for transverse faults, the above mentioned method is employed which, however, has the fundamental drawback that two or four additional testing probes are to be employed which work in the above mentioned manner, while, however, a checking of the functionability of these additional testing probes remains impossible.

It is, therefore, an object of the present invention to provide a method of an apparatus for testing a welding seam or like longitudinal formation by ultrasound energy, which will overcome the above mentioned drawbacks and will permit the testing of longitudinal and transverse faults in welding seams in the same operation-safe manner as it has heretofore been possible exclusively with the testing for longitudinal faults.

These and other objects and advantages of the invention will appear more clearly from the following specification in connection with the accompanying drawings, in which:

FIG. 1 diagrammatically illustrates in view an ultrasound head or probe with an ultrasonic transmitter sound radiating toward two sides.

FIG. 2 is a side view of the ultrasound probe of FIG. 1.

FIG. 3 diagrammatically illustrates an ultrasound head or probe with an adapter member preceding the ultrasonic vibrator.

Figure 1:
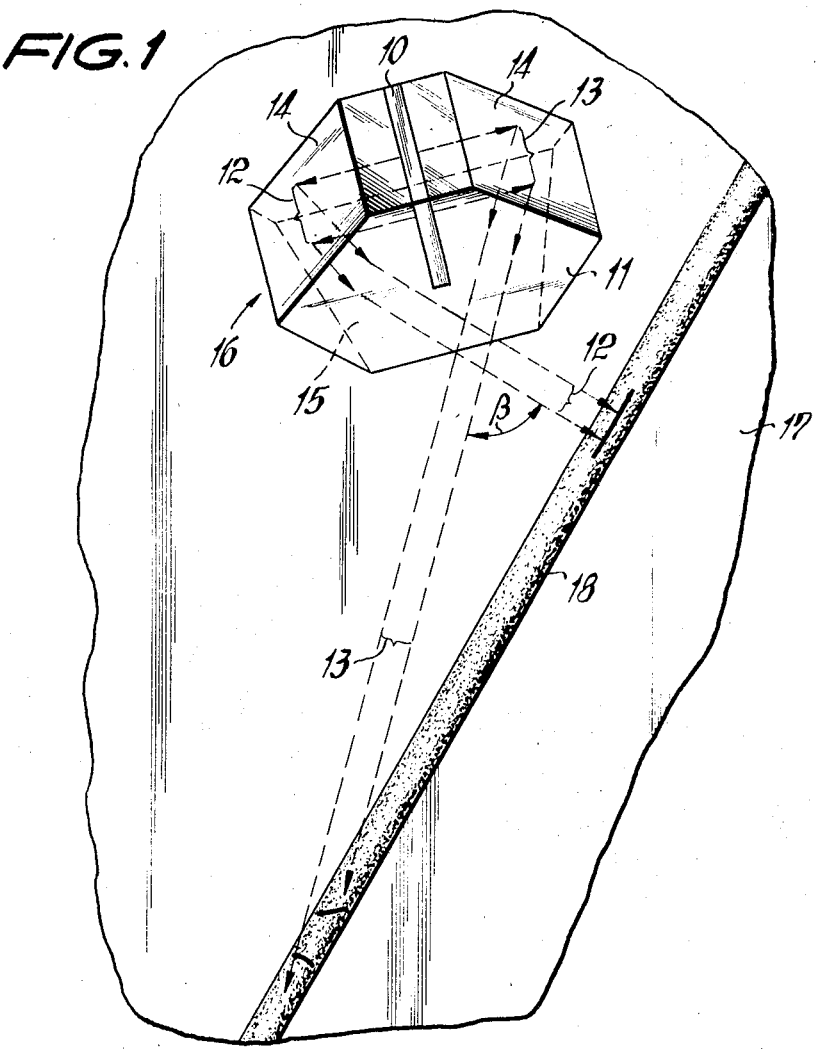

The above outlined objects have been realized according to the present invention according to which each ultrasound head or probe produces ultrasonic vibrations and separates the ultrasonic rays into a plurality of sound ray bundles and emits at least two sound ray bundles simultaneously or receives two sound ray bundles simultaneously or one after another. The said sound ray bundles are through a common coupling surface introduced into the material to be tested or received therefrom, and each ultrasound head is so guided that a sound ray bundle hits perpendicularly upon the longitudinal axis of the welding seam, whereas the other sound ray bundles intersect the longitudinal axis of the welding seam at different angles less than 90°. Each of the ultrasound heads provided for carrying out the method according to the invention has only one ultrasonic transmitter According to a further feature of the invention, the ultrasonic transmitter, which radiates sound toward both sides, is embedded in a sound-conducting body of synthetic material the shape of which is so selected that the two sound ray bundles are separated and guided in such a way that they move through the common coupling surface in the predetermined direction with regard to the welding seam.

With another ultrasound head equipped with an ultrasonic transmitter arranged in a well-known manner whose sound radiation toward one side is weakened by the arrangement of dampening material so that the emission of the ultrasound energy is effected toward the other side, a sound-optically acting adapter member precedes said last mentioned ultrasonic transmitter, which sound radiates toward one side. The said adapter member forms a sound-conducting body of synthetic material which is provided with one or more cuts filled with a material which does not or only poorly conducts sound, said cuts being provided on that side which faces away from the ultrasonic transmitter. That surface of said sound-conducting body which faces toward the coupling surface extends from the outside toward the center at an incline or in a polygonal manner. It is not necessary at any rate to de-limit the split of the sound radiation caused by the shape of the adapter member, by means of a zone which is not sound permeable or only poorly sound permeable such as cuts with a corresponding filling.

The adapter member has associated therewith a lead or precession chamber which is filled with a sound-breaking liquid confined by a sleeve.

The sound transfer to the material to be tested may be effected from the said chamber directly as well as from an adapter member which precedes said chamber and conducts sound while being in conformity with the surface of the material to be tested.

In view of the splitting up of the sound ray bundle, which has been emitted toward one side by an ultrasound transmitter by means of optical steps such as mirroring and refracting, two or more sound ray bundles are produced which in a predetermined and desired direction are conveyed to the welding seam. By correspondingly different inclinations of the sound reflecting of sound refracting surfaces of the said synthetic body or of the adapter member, the sound-in angle of the individual sound ray bundles $a_1$ to $a_n$ can be selected differently so that for instance the sound ray bundle $a_1$ enters the work piece with a sound-in angle $\alpha_1 = 45°$ while the sound ray bundle $a_2$ enters the work piece to be tested at an angle $\alpha_2 = 60°$ etc. By sound-in angle is meant the angle between the normal perpendicular to the surface of the material to be tested and the sound ray, of the individual sound ray bundles $a_1$ to $a_n$ by sound focusing boundary surfaces, it is possible to obtain a desired bundling and/or spreading effect for the sound ray bundle.

Inasmuch as the separated sound ray bundles emanated from only one ultrasound transmitter pass through a common coupling surface into the welding seam to be tested, it is possible by a known arrangement to carry out not only a testing as to longitudinal and transverse faults in the welding seam but at the same time also to carry out the function test of the ultrasound heads through a sound-through test by means of the sound ray bundle directed perpendicularly onto the longitudinal axis of the welding seam.

Expediently, the application of the suggested method for destruction-free testing of welding seams according to which two ultrasound heads are employed which are guided parallel to the longitudinal axis of the welding seam while being arranged opposite to each other can in repeated continuous cycles be effected in such a way that the following functions are met:

a. Testing for longitudinal faults,
b. Testing for transverse faults,
c. Coupling test.

The tests according to these functions may individually or in combination or with the exchange of the activity of the two ultrasound heads be controlled as working cycles. For instance, during the first cycle, one of the two ultrasound heads emits, whereas the other ultrasound head is ineffective and through the intervention of a sound ray bundle receives sound waves reflected at the longitudinal faults in the welding seam, the signals of said sound waves being measured through the intervention of a monitor orifice. During the second cycle, the ultrasound heads interchange their functions. With the third cycle, through the sound ray bundle directed perpendicular to the welding seam, there is effected in a manner known per se by means of the sound-through method a coupling test and at the same time through further sound ray bundles with the pertaining monitor orifices there are effected tests for transverse faults, whereas during the fourth cycle the ultrasound heads exchange their functions once more.

Figure 2:
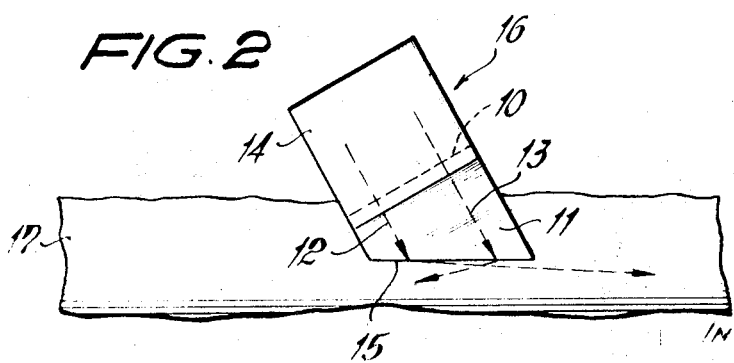

Referring now to the drawings in detail, an ultrasound transmitter 10 (FIG. 1) — the illustrated symmetric position is not necessary and in some instances, for instance, for energetic reasons a non-symmetric position may be more advantageous — is embedded in a sound-conducting body 11 of synthetic material for instance of polymethaacrylicester, and more specifically in such a way that a sound ray bundle 12 radiates toward one side, whereas the sound ray bundle 13 radiates to the other side. The sound ray bundles 12, 13 hit upon a reflecting inclined surface 14 of the body 11 which surface is so located that the reflected sound ray bundles 12, 13 leave the ultrasound head 16 through a common coupling surface 15 (FIG. 2). The sound ray bundles 12, 13 which, during a transfer from the body 11 into a work piece 17, for instance a pipe or another bowl or plate-shaped test body, will be subjected to a refraction, have in view of the size and geometry of the body 11, been sent into two different directions which with each other confine an angle $\beta$ from 0° to 90°, for instance 30°, 45° or 60°. The angle $\beta$ is the angle between the sound ray bundle 12 hitting perpendicularly upon the longitudinal axis of the welding seam 18, and the sound ray bundle 13.

Figure 3:
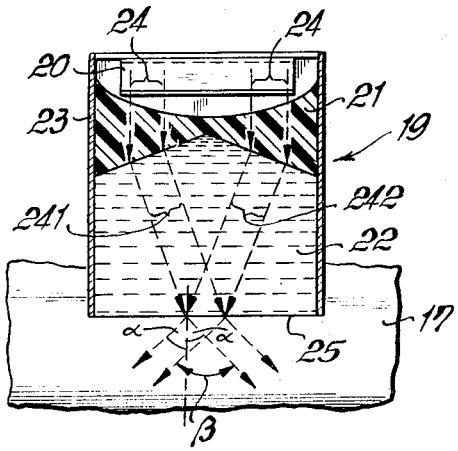

FIG. 3 shows a different embodiment of an ultrasound head 19 according to which the ultrasonic transmitter 20 is preceded by an adapter member 21 forming a sound conducting body of synthetic material. The surfaces of the adapter member 21 on the sound-emitting side extend at an angle from the outside toward the center. A lead or precession chamber 22 follows. The lateral confinement of the chamber 22 is formed by a sleeve 23. For purposes of deviating the sound ray bundle, and for purposes of the sound coupling, the said chamber 22 is filled with a liquid for instance water which at the border area toward the adapter member 21 breaks the sound. In view of these sound optical features, the ultrasound bundle 24 which emanates from the ultrasound transmitter 20 is separated into the sound ray bundles 241, 242 and through the intervention of the common coupling surface 25 and at the same or different sound-in angles $\alpha$ is introduced into the work piece 17 where a further refraction of the two sound ray bundles 241, 242 occurs. In the work piece 17, analogous to the sound ray bundles 12, 13 of FIG. 1, the sound ray bundle 241 hits perpendicularly upon the welding seam, whereas the sound ray bundle 242 will then be offset at an angle $\beta$ with regard to the sound ray bundle 241 and will be directed toward the welding seam. With this ultrasonic transmitter 20, the sound radiation toward the other side is weakened by the arrangement of damping material.

Figure 4:
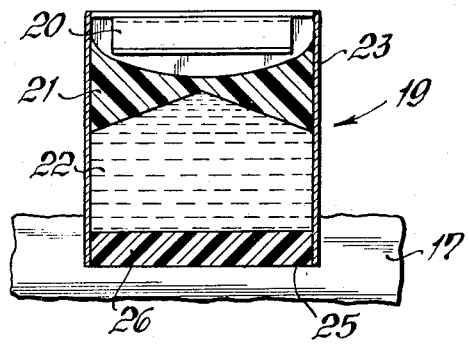
FIG. 4 shows the ultrasound head of FIG. 3 with an adapter member.

When employing ultrasound heads for work pieces, the surface of which is not plane but is primarily arched, it is advantageous to have an adapter member 26 of sound-conducting synthetic material precede the chamber 22 (FIG. 4).

Figure 5:
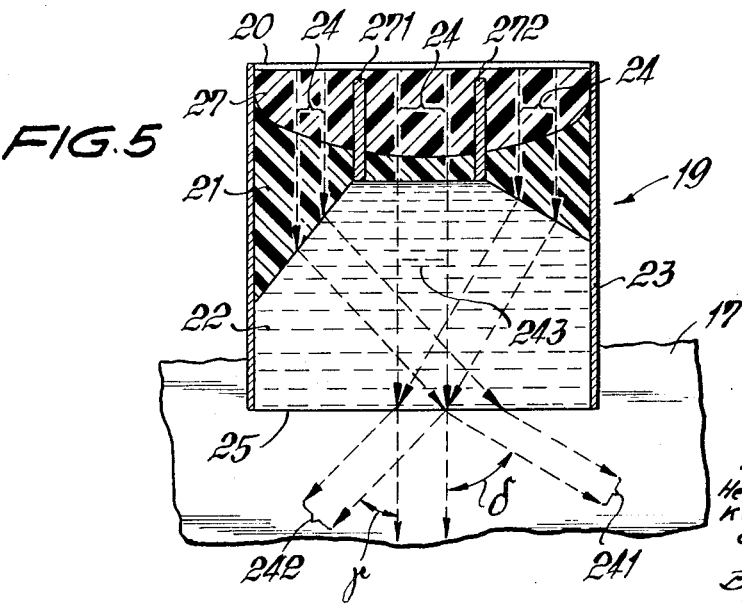
FIG. 5 represents an ultrasound head similar to that of FIG. 3 in which the sound ray bundle emitted by the ultrasonic transmitter is split up into three sound ray bundles.

In contrast to FIG. 3, the arrangement of FIG. 5 has an ultrasound head 19 with an adapter member 27 which, filled with a non-sound-conducting material and in view of means defining the two cuts 271, 272 filled with a non-sound-conducting material splits the sound ray bundle 24 emitted by the ultrasound vibrator 20 into three sound ray bundles 241, 242, 243 so that corresponding sound optical measures, namely the location of the three border surfaces, the said sound ray bundles 241—243 respectively enter the work piece at three angles. More specifically, the two angles $\gamma$ and $\delta$ between the intermediate sound ray bundle 243 and the two lateral sound ray bundles 241, 242 may have either the same or different values. Thus, for instance, it is possible to select the angle γ as an angle of 45° and to select the angle δ as an angle of 60°.

Figure 6:
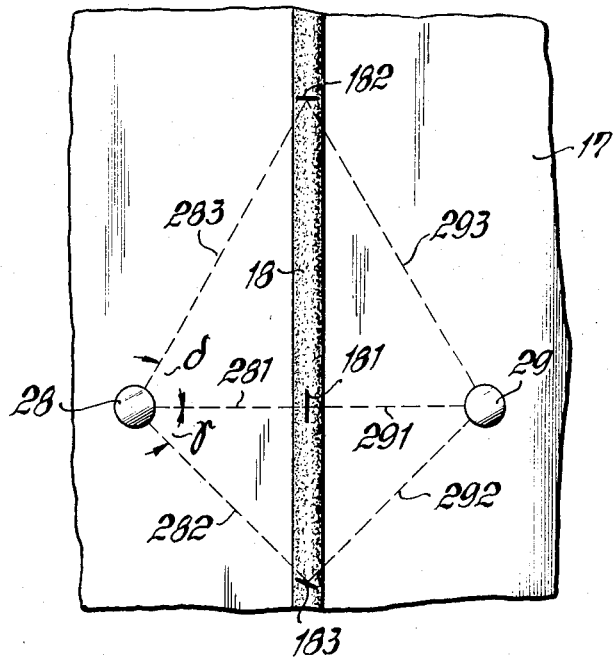
FIG. 6 shows an arrangement of the ultrasound heads for the employment of the method according to the invention.

The employment of the testing method according to the invention will now be explained in connection with FIG. 6 showing the arrangement of two ultrasound heads on a work piece which has a welding seam extending in the longitudinal direction.

The two ultrasound heads 28, 29 which are located opposite to each other are on the work piece 17 guided parallel to the welding seam 18 with a longitudinal fault 181 and the two transverse faults 182, 183.

These ultrasound heads are able at different angles to emit the sound ray bundles 281—283 and 291—293. Of these bundles, the fast ray bundle 281 or 291 hits perpendicularly upon the longitudinal axis of the welding seam, whereas the sound ray bundles 282 and 283; 292, 293 hit the welding seam 18 at angles γ and δ which are between 0° and 90°. For instance, the angle γ = 45° between the sound ray bundles 281 and 282, and the angle δ = 60° between the sound ray bundles 281 and 283.

Figure 7:
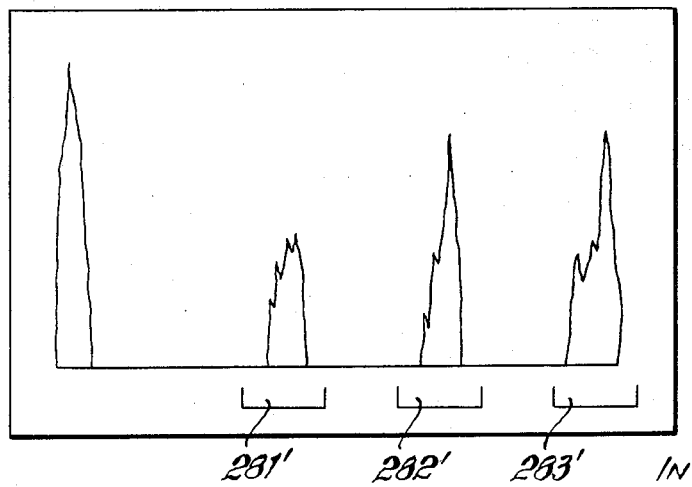
FIG. 7 represents the monitor adjustment on the ultrasound device in conformity with the arrangement of FIG. 6.

The testing method operates in conformity with a plurality of periodically repeated cycles and in view of the different paths of the sound ray bundles 281—283; 291—293 permits scattering of the tested areas through corresponding monitor adjustment on the ultrasound device as illustrated diagrammatically in FIG. 7. The following table will in connection with two examples illustrate the working manner and sequence of the cycles:

| Emission With Ultrasound Head | | Reception by Means of Sound Ray Bundles | | | | Monitor Orifice | |
|---|---|---|---|---|---|---|---|
| 28 | 29 | 281/ 281' | 282/ 282' | 283/ 283' | 291/ 281' | 292/ 282' | 293/ 283' |
| I. 1 x | – | x | – | – | – | – | – |
| 2 – | x | – | – | – | x | – | – |
| 3 x | – | – | – | – | x | x | x |
| II. 1 x | – | x | – | – | – | – | – |
| 2 x | – | – | – | – | x | x | x |
| 3 – | x | – | – | – | x | – | – |
| 4 – | x | x | x | x | – | – | – |

During cycle 1 of the Example 1, the ultrasound head 28 operates as emitter and receiver, while the ultrasound head 29 is ineffective. Thus, by means of the sound ray bundle 281 through the monitor orifice 281', the welding seam 18 is tested for longitudinal faults 181. During the cycle 2, the functions of the two ultrasound heads 28 and 29 are exchanged. During the third cycle, the ultrasound head 28 emits the sound ray bundles 281, 282, 283 in three directions. The ultrasound head 29 now serves as receiver for the said three sound ray bundles 281/291 and 282 and 283 if they are reflected at transverse faults and reach the ultrasound head 29 in the form of sound ray bundles 292 and 293. Through the intervention of the monitor orifices 281', 282' and 283', the three signals of the three sound ray bundles 281, 282 and 283 are in connection with the sound ray bundles 291, 292, 293 received separately from each other. The monitor orifice 281', sound ray bundle 281 plus 291 checks the function of the ultrasound heads 28, 29 and the coupling thereof to the work piece 17. By corresponding amplifying and/or output control devices, it is possible in a manner known per se to control the sound level received in the ultrasound head 29 in conformity with the sound-through or insonating method so as to adjust said level to a normal value. The sound ray bundles 281 plus 292 and 283 plus 293 received by the monitor orifice 282' and 283' serve as indication of transverse faults 182, 183 in the welding seam 18. The time period of the individual cycles may be the same or may be of different lengths.

Example II illustrates another one of the numerous combinations of the individual working cycles inherent to testing function.

For purposes of employing the method according to the invention and the device according to the invention, it is to be understood that said method and device are not limited to the destruction-free testing of welding seams which have been selected merely by way of example but are also applicable generally to the testing of sheet metal plates, bands, rods and pipes which are tested by ultrasound energy.

For the sake of completeness it may be added that monitor orifices such as those designated with the reference numerals 282' 283' are known in the art and described for instance in the publication "Werkstoffprüfung mit Ultraschall" (Material testing by ultrasound) by J. H. Krautkrämer, second edition, published by Springer-Verlag Berlin, Heidelberg, New York, page 201 et seq.

It is also to be understood that the present invention is, by no means, limited to the showing in the drawings but also comprises any modifications within the scope of the appended claims.

What we claim is:

1. A method of checking the material of a workpiece along a linear formation for longitudinal and transverse faults in the heterogeneity of the material which includes the steps of: producing ultrasonic vibrations from a single source, separating the ultrasonic rays from said vibrations into a plurality of distinct ultrasonic ray bundles, transmitting said bundles of rays substantially simultaneously to said linear formation with one of said bundles at a right angle to said linear formation and another bundle of rays at less than a right angle to said linear formation, and receiving and recording the rays reflected by said linear formation from each of said bundles, so that reflections of the ray bundle at right angles will indicate longitudinal faults and reflections from the ray bundle at less than a right angle will indicate transverse faults.

2. A method according to claim 1, in which a plurality of ultrasonic ray bundles are transmitted from each of two single sources of vibrations positioned on opposite sides of said longitudinal formation with the bundles of each source directed to said longitudinal formation at similar angles, said sources operating successively so that one source is inactive when the other source is transmitting.

3. A method according to claim 2, in which said ultrasonic ray sources are both transmitters and receivers, the inactive transmitter acting as a receiver to actuate a recorder when the other source is transmitting.

4. A method according to claim 1, in which said ultrasonic ray source transmits three ray bundles at angles to each other, two of said bundles being directed to said longitudinal formation at different angles less than a right angle.

5. An apparatus for non-destructively checking a workpiece, especially a welding seam, in its longitudinal as well as in its transverse direction as to faults in the heterogenity of the section of the material to be checked, which includes: only two ultrasonic heads adapted respectively to be placed on opposite sides of and substantially adjacent to the material section to be checked, and respectively associated with said heads and operable alternately to maintain one of said heads inactive while causing the other head to send sound ray bundles to the material section to be checked and to receive sound waves reflected by said material section to thereby detect faults in the longitudinal and transverse direction of the material section to be checked, and monitor means for recording the reflected sound waves, each of said heads have only one ultrasonic vibrator, the ultrasonic vibrator being adapted respectively to emit two sound ray bundles to opposite sides of said vibrator and which includes a body of synthetic material having said vibrator embedded therein and being adapted to conduct sound, said body being so designed that said two ultrasonic ray bundles are refracted and guided in such a way that they extend through a common coupling surface in predetermined directions toward the material section to be checked.

6. An apparatus for non-destructively checking a workpiece, especially a welding seam, in its longitudinal as well as in its transverse direction as to faults in the heterogenity of the section of the material to be checked, which includes: only two ultrasonic heads adapted respectively to be placed on opposite sides of and substantially adjacent to the material section to be checked, means respectively associated with said heads and operable alternately to maintain one of said heads inactive while causing the other head to send sound ray bundles to the material section to be checked and to receive sound waves reflected by said material section to thereby detect faults in the longitudinal and transverse direction of the material section to be checked, and monitor means for recording the reflected sound waves, a unilaterally emitting ultrasonic vibrator, and a sound-optical-principle adapter arranged in front of said vibrator, said adapter forming a sound conducting synthetic body having that side thereof which faces away from said ultrasonic vibrator provided with means defining cuts filled with material which is a poor sound conductor, that side of said synthetic body which faces the coupling surface extending at an incline from the outside toward the center.

7. An apparatus according to claim 7, which includes a lead chamber associated with said adapter and filled with a sound refracting liquid, and sleeve means defining boundary for said chamber.

8. An apparatus according to claim 7, which includes adapter member arranged in front of said chamber and complementarily shaped in conformity with the surface of the workpiece to be checked.

* * * * *